(12) United States Patent
Mohindra et al.

(10) Patent No.: US 11,087,265 B2
(45) Date of Patent: Aug. 10, 2021

(54) SYSTEM, METHOD AND RECORDING MEDIUM FOR CAUSALITY ANALYSIS FOR AUTO-SCALING AND AUTO-CONFIGURATION

(71) Applicant: International Business Machines Corporation, Armonk, NY (US)

(72) Inventors: Ajay Mohindra, Yorktown Heights, NY (US); Rohit Ranchal, Cambridge, MA (US); Ram Ravishankar, Irvine, CA (US); Nianjun Zhou, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 954 days.

(21) Appl. No.: 15/235,973

(22) Filed: Aug. 12, 2016

(65) Prior Publication Data
US 2018/0046951 A1 Feb. 15, 2018

(51) Int. Cl.
*G06Q 10/06* (2012.01)

(52) U.S. Cl.
CPC ....... *G06Q 10/067* (2013.01); *G06Q 10/0637* (2013.01)

(58) Field of Classification Search
None
See application file for complete search history.

(56) References Cited

U.S. PATENT DOCUMENTS

| 7,403,487 B1* | 7/2008 | Foladare | H04L 41/0896 370/232 |
| 8,732,302 B2* | 5/2014 | Jorgenson | H04L 41/12 709/224 |
| 9,497,072 B2* | 11/2016 | Gates | G06F 11/0709 |

(Continued)

OTHER PUBLICATIONS

L. Xu, G. Tan, X. Zhang and J. Zhou, "A BDI agent-based approach for Cloud Application autonomic management," 4th IEEE International Conference on Cloud Computing Technology and Science Proceedings, Taipei, 2012, pp. 574-577. (Year: 2012).*

(Continued)

*Primary Examiner* — Leland Marcus
(74) *Attorney, Agent, or Firm* — Samuel Waldbaum, Esq.; McGinn I.P. Law Group, PLLC.

(57) ABSTRACT

Similar to other Cloud Service, Solution as Services over Cloud, as single tenant technology, also requires support of agility and flexibility as a fundamental feature of Cloud computing. Different from other Cloud services, the agility and flexibility typically are not triggered by the typical performance metrics, but at the business level of metrics. A causality analysis method, system, and non-transitory computer readable medium using a causal graph depicting relationships among observable primitive metrics from infrastructure, middleware, and business metrics and latent business metrics of an application, include identifying a metric value resulting from measuring the system and application metrics, determining an impact of the measurement of the metrics on the business metrics associated with the measurable metrics in the causal graph, and determining an (Continued)

action to take with respect to the impact on the business metric based on the pre-defined business policies.

20 Claims, 10 Drawing Sheets

(56) References Cited

U.S. PATENT DOCUMENTS

| | | | | |
|---|---|---|---|---|
| 2004/0230444 | A1* | 11/2004 | Holt | G07F 17/32 370/329 |
| 2009/0177692 | A1* | 7/2009 | Chagoly | G06F 11/0709 |
| 2010/0142242 | A1* | 6/2010 | Wang | G11C 7/02 365/49.17 |
| 2011/0065500 | A1* | 3/2011 | Gould | A63F 13/792 463/29 |
| 2012/0140620 | A1* | 6/2012 | Hogan | H04L 41/147 370/230 |
| 2013/0046721 | A1* | 2/2013 | Jiang | G01W 1/10 706/47 |
| 2013/0197675 | A1* | 8/2013 | McCarthy | G06Q 10/00 700/28 |
| 2015/0019241 | A1* | 1/2015 | Bennett | G16H 50/20 705/2 |
| 2015/0280968 | A1* | 10/2015 | Gates | G06F 11/30 714/37 |
| 2016/0182320 | A1* | 6/2016 | Bartfai-Walcott | H04L 41/145 709/224 |
| 2018/0241843 | A1* | 8/2018 | Bardhan | H04L 67/322 |

OTHER PUBLICATIONS

M. Hasan. The Management of Data, Events, and Information Presentation for Network Management. PhD thesis, Department of Computer Science, University of Waterloo, Canada, 1995. (Year: 1995).*

Z. Huang, K. Lin, J. Zhang, W. Nie and L. Han, "Performance Diagnosis for SOA on Hybrid Cloud Using the Markov Network Model ," 2013 IEEE 6th International Conference on Service-Oriented Computing and Applications, Koloa, HI, 2013, pp. 17-24. (Year: 2013).*

Mel, et al. "The NIST Definition of Cloud Computing". Recommendations of the National Institute of Standards and Technology. Nov. 16, 2015.

* cited by examiner

FIG. 4

- Set $S$ as the set of nodes and $P$ as the set of the parent nodes of $S$

Initialization: 1) $S$ as all the leaf nodes

2) $s(i,t) = -1$ for all nodes and $d(i,t) = h_i[s(i,t)] = h_i[-1]$

While (Monitoring System is up and time is $t$) (Loop 1)

For $i = 1$ to $n$ (Loop 2) - all of the leaf nodes $s(i,t) = f_i[s(i_j,t): j \in [1,n]]$: : Ternary qualification of leaf nodes, n – umber of leaf nodes Assign $P$ <- Parent Nodes of $S$ Repeat: (Loop 3)

For $i = 1$ to $m$ (Loop 4) - all parent nodes (set $S$)

$s(i,t) < - g_i[s(i_j,t): j \in [1,k]]$:   k – all the children nodes of node i

End of Loop 4

Assign $S < -S \cup P$

Assign $P$ <- Parent Nodes of $S$

End of Loop 3 if $P = NULL$

End of Loop 2

For $i = 1$ to $q$ (Loop 5) - all of the top nodes of causality tree

Assign $d(i,t) = h_i[s(i,t)]$:  A decision

End of Loop 5

End of Loop 1

SYSTEM, METHOD AND RECORDING MEDIUM FOR CAUSALITY ANALYSIS FOR AUTO-SCALING AND AUTO-CONFIGURATION

BACKGROUND

The present invention relates generally to a causality analysis method, and more particularly, but not by way of limitation, to a causality analysis system, method, and recording medium for auto-scaling and auto-configuration of computing capabilities based on values generated by the computing process.

Business level performance metrics are essential to making scalability decisions for solutions deployed over Cloud platform, which are primarily based on the traditional monitoring of compute, network, storage and task execution. Performance monitoring of Cloud solutions is done at application, middleware and infrastructure with different performance indicators at each layer. However, traditional monitoring fails to capture the causality relationships between metrics at different layers. Moreover, these layers do not capture the business level performance indicators in driving decisions for solution scalability. The scalability includes infrastructure scalability (scale-up and scale-down) and application level of scalability (increasing or decreasing inbound tasks, and client usage). Furthermore, there is a significant diversity in the architecture and metrics for different solutions.

Cloud Software as a Service (SaaS) offerings conventionally provide a service focused on a specific user need for (e.g., Google Docs™ and Microsoft Office 365™) services are online document editing SaaS services. On the other hand, Solution as a Service (SlaaS) offerings are a bundle of fully self-managed services deployed over Cloud as a single entity that are focused on specific problems. The requirements for auto-scaling and auto-configuration at SlaaS level are related to the typical SaaS level of auto-scaling, but they are not the same. SlaaS level auto-scaling and auto-configuration will optimize the resources for a SlaaS offering based on changes in the solution business requirements. The optimization is not limited to the infrastructure optimization.

SUMMARY

In some conventional techniques, an intensive I/O or CPU utilization task might not need to trigger any action if the results of these computations do not have an impact on the services being offered to end-users (Client—Solution SLAs). Some solutions might need auto-configuration instead of auto-scaling to optimize the solution by tuning the configuration files or parameters resides inside of the application. A reason behind this is the difference in usage patterns of SlaaS versus SaaS. Typically, SlaaS is a single tenant model compared to the SaaS which has multi-tenancy. Different from SaaS application, the scalability of the SlaaS solution targets to the needs of the tenant. Furthermore, certain auto-configuration is required to satisfy the business optimization of the hosted solution. Such tuning typical involves the changes the application parameters at the application instead of the system layer.

Due to this, the inventors have identified the problem that the scalability or configuration actions in SlaaS may or may not come from the end-user operations. It might come from the need of system internal business processing and outcomes. This brings in different complexity of mapping and linkage of user and solution operations with automatic actions. To cope with such a complex environment, the inventors have identified a need for smart methods to collect system information to aid automatic or manual decision making.

That is, the inventors have identified a technical problem in the conventional techniques that the layers do not capture the business level performance indicators in driving decisions for solution scalability, that the conventional monitoring fails to capture the causality relationships between metrics at different layers, and that there is a significant diversity in the architecture and metrics for different solutions which is not captured by traditional monitoring thereby causing the scalability, auto-configuration and auto-scaling of IT solutions running in the Cloud environment based on the requirements of business performance changes to be sub-optimal.

In view of the above technical problems with the conventional techniques, the inventors have considered a non-abstract improvement to a computer technology via a technical solution to the problem related to scalability, auto-configuration and auto-scaling of IT solutions running in the Cloud environment based on the requirements of business performance changes by using a mapping defined as multiple level of causality to aggregate the metrics across different Cloud layers—the infrastructure, platform and application, and propagate the lower level state(s) into business performance using logical operations (such as binary or tertiary logic) or structural equation models. The lower level state can be directly measured from the instant value of the measured attribute value, or it comes from the function of a time series of the measured attributes, such as the average, variance, and or the direction of trend. Those operations and models are used to used to assess unobservable 'latent' higher level solution states or metrics. The technical solution can be applicable to different outcome-driven scenarios for configuring solutions (either opt to client business value, or opt to Cloud or service providers).

In an exemplary embodiment, the present invention can provide a causality analysis method using a causal graph depicting a relationship between a system metric and a business metric of an application, the method including identifying a value resulting from measuring the system metric, determining an impact of the measurement of the system metric on the business metric associated with the system metric in the causal graph, and determining an action to take with respect to the impact on the business metric.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 4 exemplary depicts an alert aggregation algorithm for Step 102 to determine an impact of the measured value on the business metrics associated with the system metrics. The process can be mathematically expressed as a process of tertiary logic operations.

DETAILED DESCRIPTION

Figure 1:
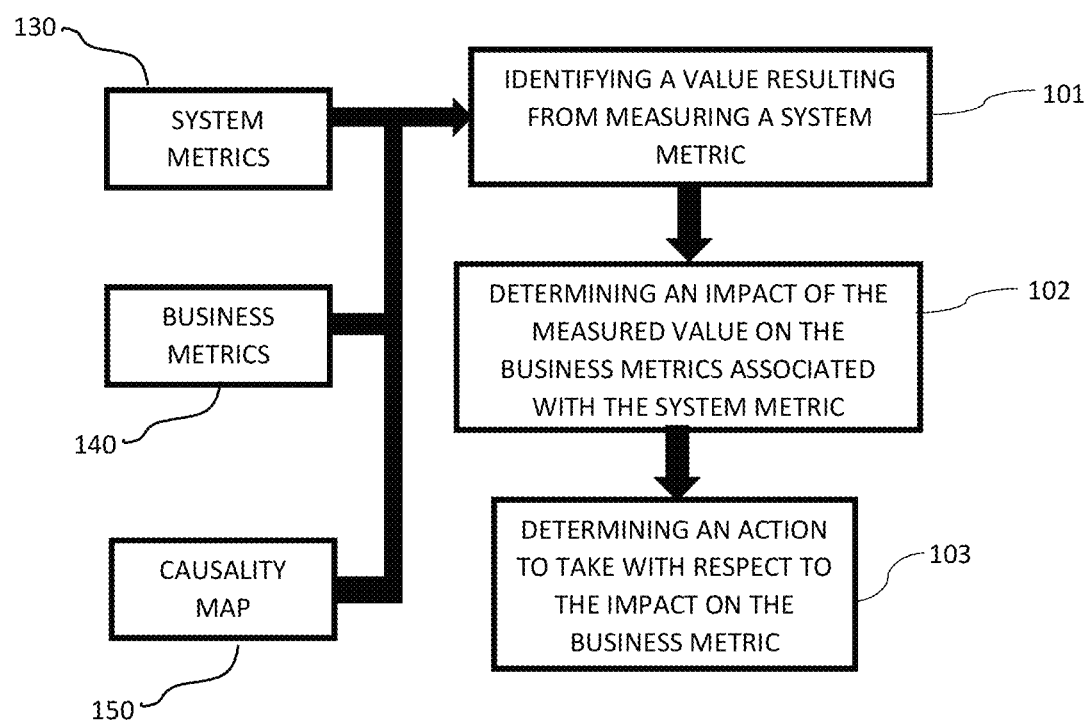
FIG. 1 exemplarily shows a high-level flow chart for a causality analysis method 100.

The invention will now be described with reference to FIG. 1-10, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the causality analysis method 100 includes various steps to provides the ability to monitor and track the business value offered by a solution, enable the use of business performance indicators along with traditional performance metrics to make efficient scalability decisions, and establish the causality of high level metrics to low level metrics at different layers to make accurate decisions. As shown in at least FIG. 6, one or more computers of a computer system 12 can include a memory 28 having instructions stored in a storage system to perform the steps of FIG. 1.

Thus, the causality analysis method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 8-10) may be implemented in a Cloud environment 50 (see e.g., FIG. 9), it is nonetheless understood that the present invention can be implemented outside of the Cloud environment.

Figure 3:
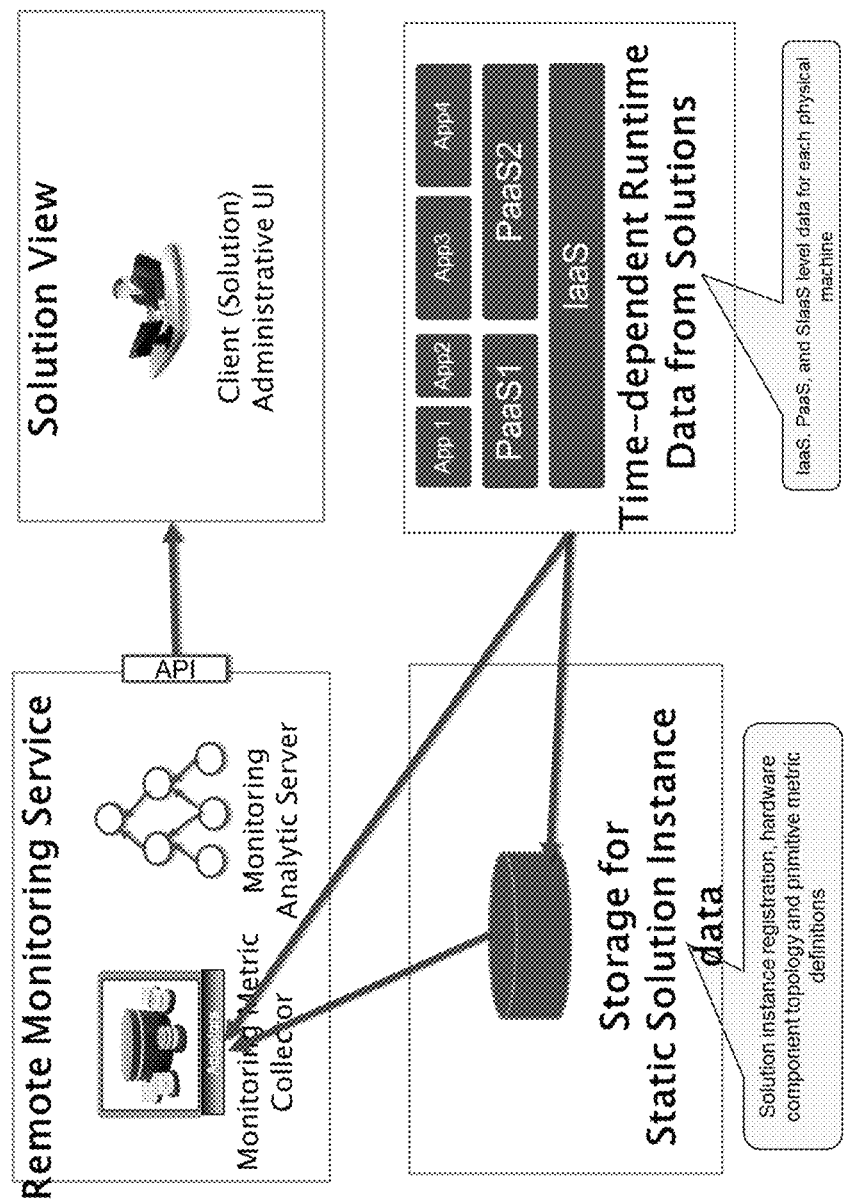
FIG. 3 exemplarily depicts a system schema with which the method 100 is executed.
Figure 5:
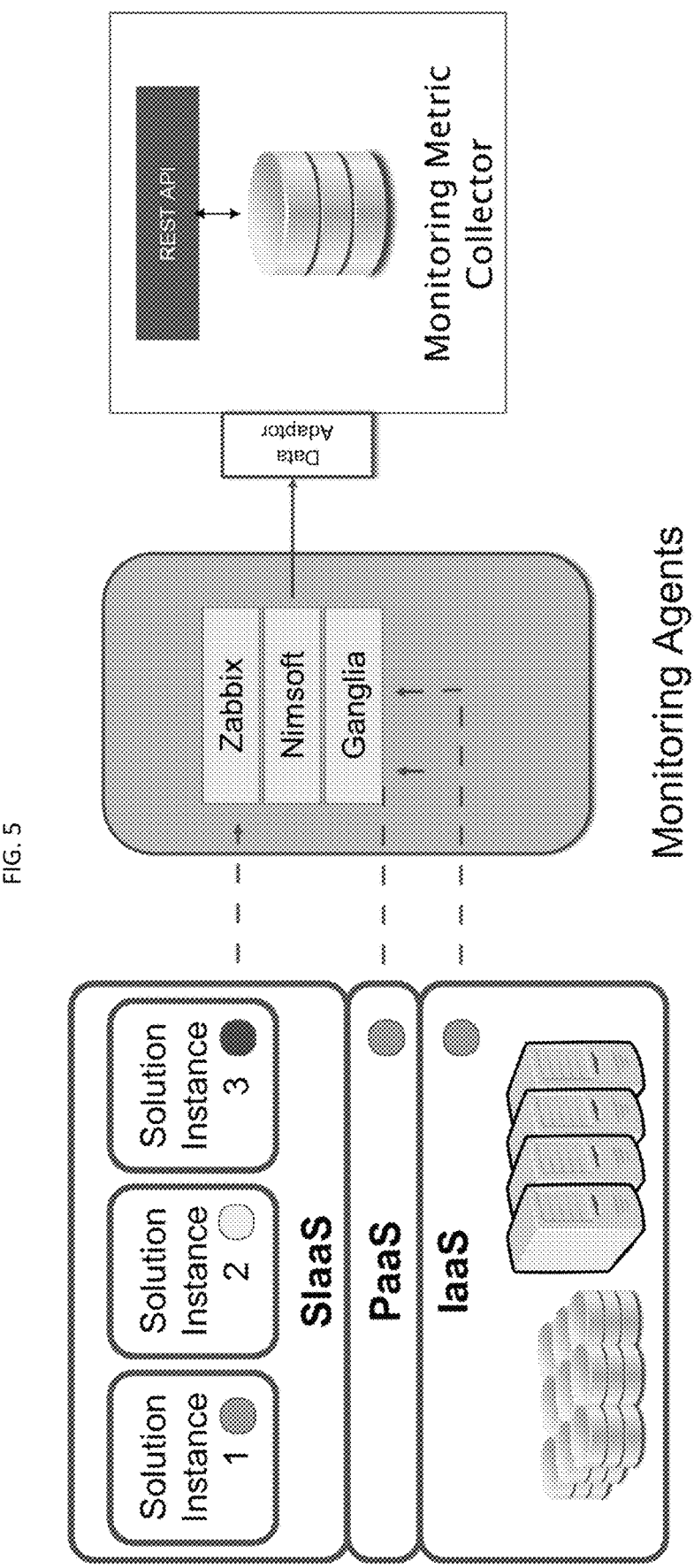
FIG. 5 exemplary depicts components of collecting metric values of FIG. 3. The monitoring agents are pre-deployed at the different level of Cloud environment and resides inside of the components of the solutions. To incorporate the needs of supporting possible monitoring agents from different vendors or open technologies, a data adaptor is used for each monitored attributes.
Figure 6:
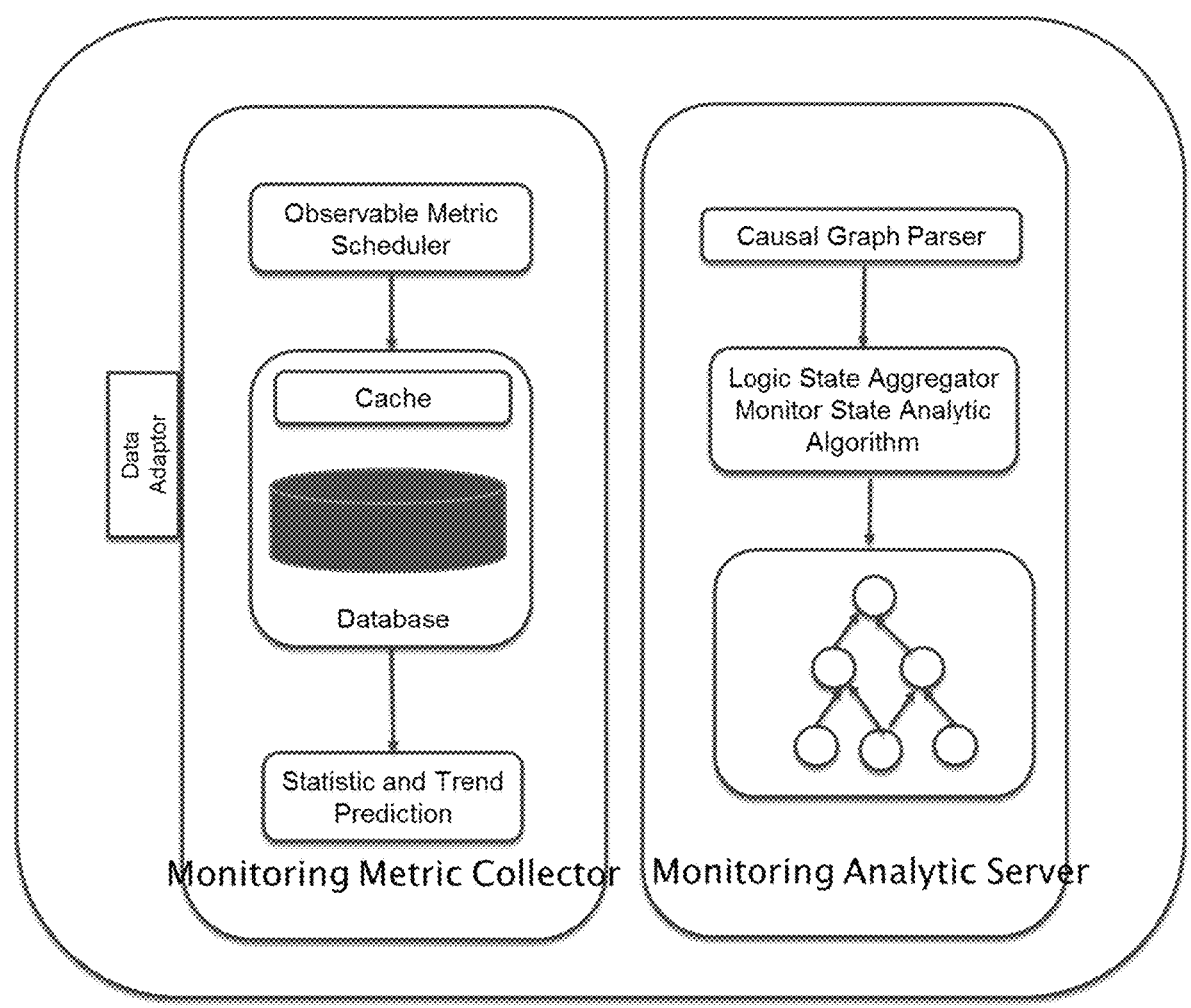
FIG. 6 exemplary depicts components of core engine of the monitoring metric collector and the monitoring analytic server of FIG. 3. There are two parts of the core engine. The first part contains the data storage, cache and trend-detecting components. A scheduler sends the message to the agents to collect the metric value from various agents deployed over the application deployed over the Clouds. A permanent storage to store the measured attributes values. An in-memory-cache is used to store time series of the attributes required for states or status required operation on those time series. The statistic and trend prediction component is used to create the state/status from the cached time series. Another part is the analytic components. The causal graph parser is used to parse the defined causality relationship and use this to generate the operation commands for the state and status aggregation from lower measurable level to the latent and decision levels. A real-time state graph is generated used the aggregation algorithm.
Figure 7:
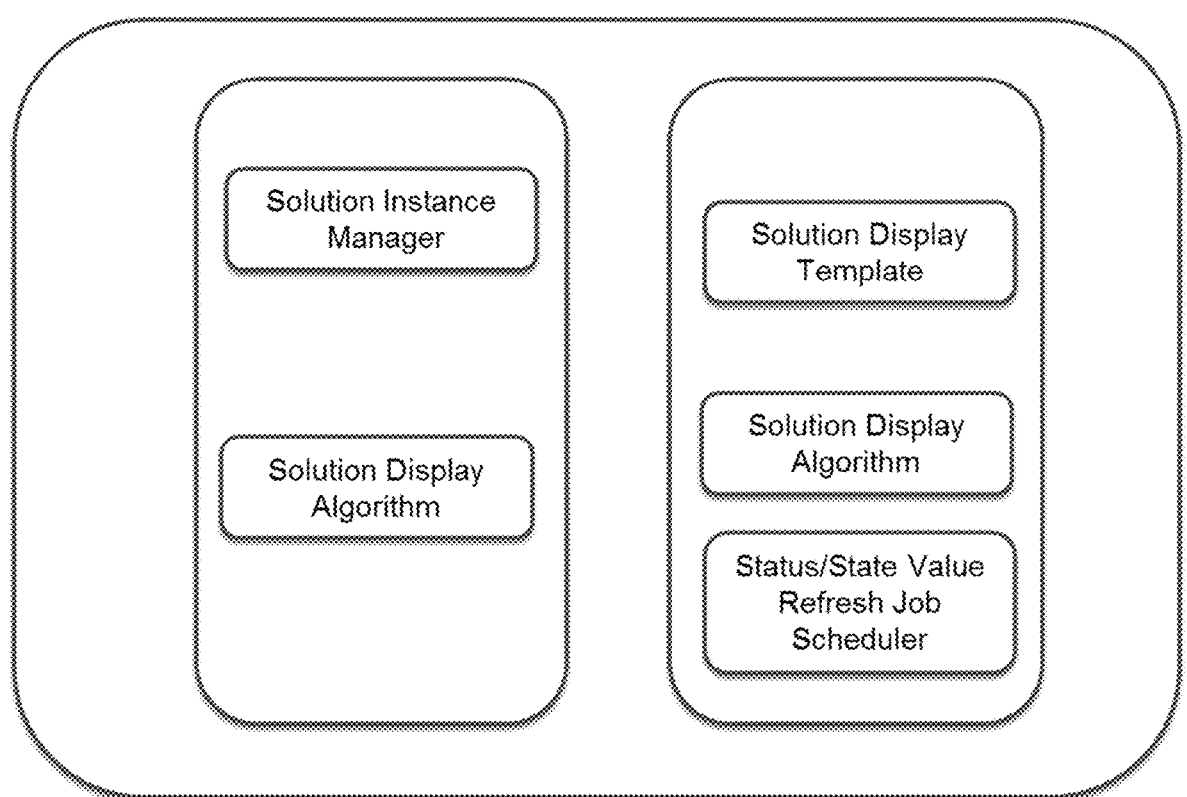
FIG. 7 exemplary depicts components of solution view of FIG. 3. As it is a multi-tenant system. There is a solution instance manager to manage the monitoring process to different applications. It allows the end-user to add, or modify or delete a causality analysis for a given solution. In addition, the end-user can choose different solution display templates. To display the real-time states of different observable and latent nodes, a solution display algorithm component handles the visual display of the real-time the status and state value of the observable and latent nodes. There is a Refresh Job Scheduler to control of updating the visual display. Another visual component is the Decision Display & Action Invocation UI.

FIG. 3 depicts an exemplary system schema that pools (e.g., via the monitoring metric collector of the monitoring service 3) monitored primitive "n" metrics from different systems (e.g., the static solution instance data 1 and the time-dependent running data from solutions 2 deployed over Cloud environment, typically over IaaS and/or PaaS) as a function of time with pre-defined time intervals for different primitive metrics. The monitoring metric collector categorizes and stores monitored data from different layers (e.g., business, application, platform, and infrastructure) into a storage, such as database. The different components of the monitoring metric collector are exemplarily depicted in FIG. 5. Further, the core engine of the monitoring metric collector and the monitoring analytic server of the remote monitoring service 3 are exemplarily depicted in FIG. 6.

Figure 2:
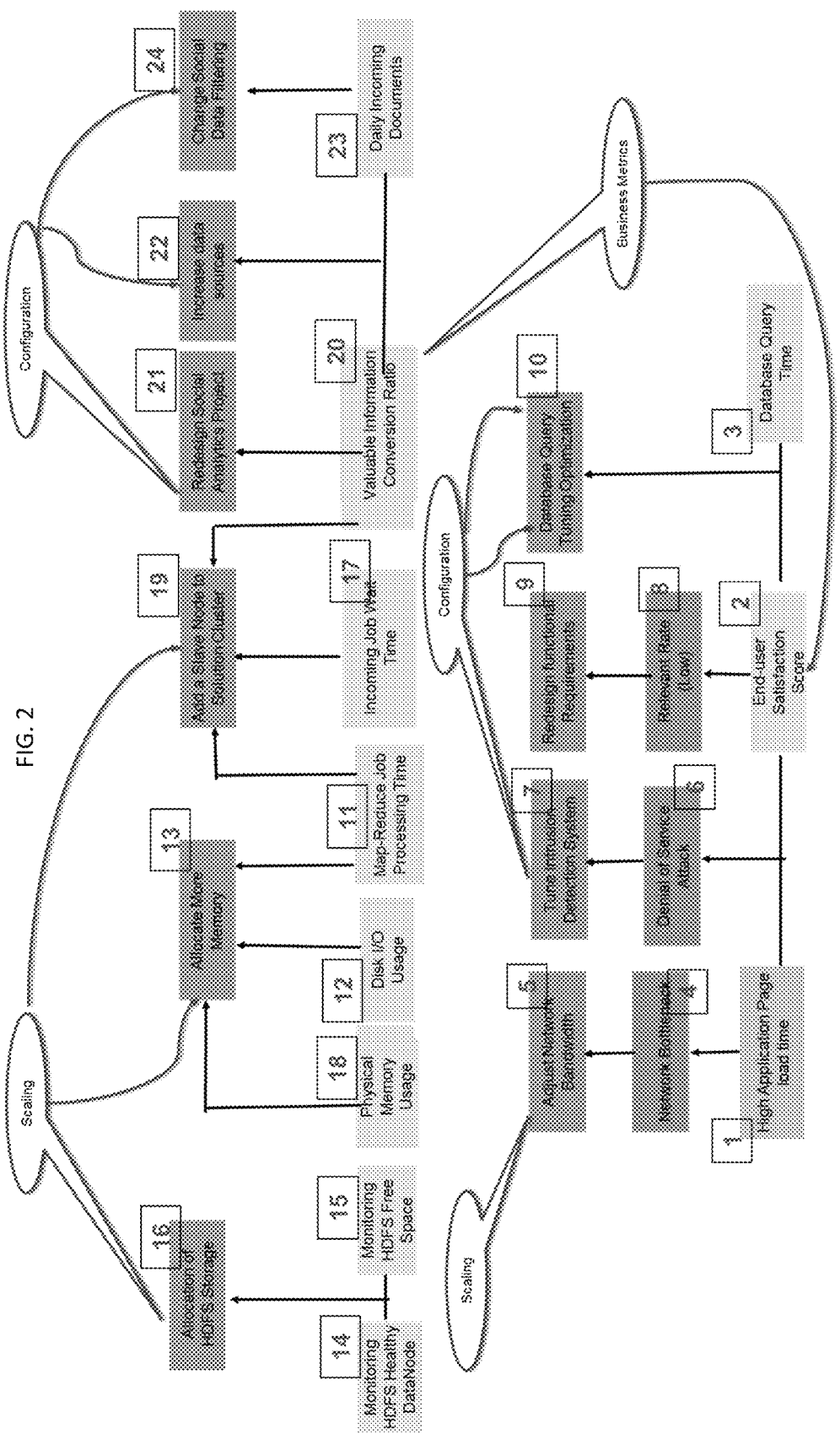
FIG. 2 exemplarily shows a causal graph of an Analytics Solution of Identifying Influence Leaders through Social Media Mining (such as Twitter, Blog, Weibo and Wechat) with leaf-nodes 1, 2, 3, 12, 14, 15, 17, 18, 20, and 23 being observable nodes corresponding to metrics being able to observed directly, solution nodes 5, 7, 9, 10, 13, 16, 19, 21, 22, and 24 being decision node associated to auto-scaling and auto-configuration scripts, and non-leaf nodes 4, 6, 8 being latent nodes associated to the latent business states or variables.

The monitoring analytic server of the monitoring service 3 creates an acyclic directed tree (causal graph 150) with a pool of leaf nodes corresponding to the monitored metrics as shown in FIG. 2 such that the solutions view 4 can display the acyclic tree and the client operator 5 can make a decision (or take action) of optimizing solution. The components of the solutions view 4 are exemplarily depicted in FIG. 7.

The monitoring metric collector includes all the data collected from the solutions and the monitoring analytic server performs a causality analysis and a business value analysis. The causal graph 150 can be defined of different solutions using a script language such as XML format.

FIG. 2 exemplarily shows a causal graph of an Analytics Solution of Identifying Influence Leaders through Social Media Mining with leaf-nodes 1, 2, 3, 12, 14, 15, 17, 18, 20, and 23 being observable (identifiable) nodes, decision (action) nodes 5, 7, 9, 10, 13, 16, 19, 21, 22, and 24 being decision node, and non-leaf nodes 4, 6, 8 being latent nodes. With all decision (action) nodes, node 5, 13, 16, 19 are scaling nodes, node 7, 9, 10, 21, 22, 24 are configuration nodes.

It is noted that the state of i-th node of the causal graph is set as s(i, t) and the action of i-th node which has to be a top node of the causal graph is set as d(i, t). Each node of the causal graph 150 includes a status value from a set of pre-defined m states such as RED, YELLOW, GREEN (tertiary) as a function of time.

The transformation function of the states of the individual nodes from the leaf node states is based on a causality definition where $s(i, t)=f_i(s(i_j, t): j \in [1, n])$ is set for a leaf node such that a ternary qualification indicator of (−1=RED, 1=YELLOW, 2=GREEN) as the transformation primitive metrics, $s(i, t)=g_i(s(i_j, t): j \in [1, k])$ is set for a non-leaf i-th node such that the ternary logic states of the leaf nodes form the state (e.g., latent), and $d(i, t)=h_i[s(i, t)]$ is set as a scalability decision based on the state of a decision node at the top of the causal graph.

That is, the logic behind the transformation function of the states to determine the latent nodes, the impact of the measured value on the business metrics, and the actions is based on a three-valued logic (e.g., a trinary logic, trivalent, ternary, or trilean) in which there are three truth values indicating true, false and some indeterminate third value.

It is noted that the time-dependent running data from solutions 2 of Cloud Platform includes IaaS, PaaS, Saas, and SlaaS level data for each physical machine and the static solution instance data 1 includes solution instance registration, solution component topology, and monitored metric definitions.

That is, the time-dependent running data from solutions 2 of Cloud Platform includes each lower level agent communicating with the monitoring service 3 and the static solution instance data 1 includes the configuration files of the types of solutions. The monitoring metric collector collects all the data from each agent and the monitoring analytic server sends a status (or state) of each of the agents. Therefore, the action can auto-scale and auto-configure the resources by "buying" (e.g., the owner buys more resources to be used) to scale-up the resources or can auto-configure the resources to remove nodes if the nodes are not being used. The "buying" behavior could be deployed more computing resources or simple "buying" more Twitter™ inputs to increase incoming data stream. Thus, the SlaaS can optimally operate.

With reference to FIG. 1, Step 101 identifies a value from measuring a system metric. That is, each node has a status value from a set of pre-defined m states as a function of time (such as −1, 0 or 1; negative, neural, or positive; and RED, YELLOW, or GREEN as color coding).

For example, Step 101 identifies the values for each of the leaf nodes 1, 2, 3, 12, 14, 15, 17, 18, 20, and 23 of FIG. 2 such as leaf-node 3 having a "high" value for the DB query time. Also, Step 101 can deduce values for non-leaf nodes 4, 6, 8 (e.g., latent nodes) from the leaf nodes.

Step 102 determines an impact of the measured value on the business metrics associated with the system metrics. In other words, each measured value of a system metric effects a business metric in a particular way. For example, if the system metrics indicate a large physical memory usage, the business metrics would require an adjustment to the memory to satisfy the system metrics (e.g., a scale-up). That is, the system metrics indicates the usage of SlaaS and the business metrics indicate the actions that the server can provide to accommodate the usage.

Step 102 determines the impact based on the alert aggregation algorithm, for example, as depicted in FIG. 4.

Based on the impact on the business metric determined by Step 102, Step 103 determines an action (e.g., a decision) to take with respect to the impact on the business metric. That is, Step 103 determines the action to take to resolve the issue of the impact on the business metrics. Step 103 can determine the action to take by identifying one or more policies associated with the business metric, identifying one or more actions associated with the business metric, and executing one or more actions associated with the business metric.

In other words, based on the color of the action nodes from the Ternary logic, the action can be determined.

It is noted that Step 102 determines the impact on the business metrics as correlated to the system metrics and Step 103 determines a set of decisions at the decision nodes to trigger a scale-up (scale-down) or re-configuration of the system schema resources to match the system metric values. For example, in the Cloud environment, if the system requires more memory to satisfy the demand, the memory costs a predetermined amount (e.g., business metric) and Step 103 will scale-up the memory by purchasing the memory to allow the system to continue to operate efficiently.

Therefore, the invention can provide a causality-driven method 100 that combines business value indicators with traditional performance metrics of IT solutions, providing cross-layer Cloud monitoring (existing Cloud monitoring solutions don't consider the relationships and mapping between monitoring information collected at different Cloud layers), causality-driven solution level actions based on analysis of cross-layer monitoring alerts, solution level auto-scaling and auto-configuration using digital circuit design method and implementation.

In one embodiment for an Analytics Solution of Identifying Influence Leaders in social media, if all the Hadoop instances have high CPU utilization, then the monitoring agents will generate "Busy" alerts for these instances. Aggregation of these alerts at analytics layer will generate a combined "Busy" alert.

The alert status for metrics reported by the monitoring agents can be defined as: (a) Negative, Positive {−1, 1}; (b) Red, Yellow, Green {R, Y, G}; and/or (c) simply a metric value. The metrics that agents can monitor can be categorized by: (a) Infrastructure layer monitoring metrics including statistics related to memory, disk usage, I/O network; and CPU; (b) platform layer monitoring metrics including statistics related to web server, database server; and (c) application layer monitor metrics including statistics related to page response times, database query response times, incoming request metrics-OS, location, devices. These metrics will be presented as nodes in the causal graph 150 after being identified by Step 101.

Step 102 uses Markov property for analysis by assuming that the information at the immediate parent nodes should be sufficient to infer the current status of child nodes. There are three categories of nodes: (a) Observable nodes (leaf nodes) that represent metrics and their status as reported by various monitoring agents; (b) Latent nodes (non-leaf nodes) that are derived through analysis either from Observable or other Latent nodes using Markov property; and (c) decision nodes (action nodes) that represent actionable items for infrastructure, platform and application tuning. The action can be implemented using the DevOps scripts. There are multiple ways of implementing the logic flow from the parent (observable or measurable) nodes to child (latent) nodes, for example, one way would be to use a weighted method to get the next node. To do the weighted method, Step 102 maps the status into a number. For instance, the agent states {Red, Yellow, Green} can be mapped to an integer "s" as (R, Y, G)→{−1, 0, 1} and Step 102 assigns a particular weight to each agent: "w". The range of weight Wi used here is [0, 1]. For an agent "I" with state $S_i$ and weight $W_i$, the next state is derived using the following algorithm (1):

$$s = \left\lfloor \frac{\sum_{i=1}^{n} w_i s_i}{\sum_{i=1}^{n} w_i} \right\rfloor \quad (1)$$

The bracket means that Step 102 will choose the integer part of the number. From this number, Step 102 can recursively compute the states from the observable nodes up to the decision nodes. Using this algorithm, each node will have a status of {−1,0,1} and can be mapped as {R,Y,G} to reflect how healthy of system reflected by the causal graph.

For instance, if the monitoring agents generate "Slow" alerts due to high response times of all the SlaaS URLs, then aggregating these alerts at analytics layer will generate a combined "Low performance" alert. Similarly, if some of the SQL queries beneath these pages have high response times, then a configuration problem alert will be generated.

The status of each node is a function of time with certain interval to be refresh. When certain status of decision node has been persistent for a certain amount of time, such as minutes, hours, days or weeks. Step 103 determines an action to take, and the system will be updated or configured automatically using scripts enable the Cloud configuration change.

The status of each node could be the function of the current measured value from a system or application, or business metric, or the function of the collected values of the measured values of a system or application, or business metric. In the later situation, a statistic or trend algorithm will be applied to get the status of the node.

Exemplary Aspects, Using a Cloud Computing Environment

Although this detailed description includes an exemplary embodiment of the present invention in a Cloud computing environment, it is to be understood that implementation of the teachings recited herein are not limited to such a Cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This Cloud model may include at least five characteristics, at least three service models, and at least four deployment models.

Characteristics are as follows:

On-demand self-service: a Cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a Cloud infrastructure. The applications are accessible from various client circuits through a thin client interface such as a web browser (e.g., web-based e-mail) The consumer does not manage or control the underlying Cloud infrastructure including network, servers, operating systems, storage, or even individual application capabilities, with the possible exception of limited user-specific application configuration settings.

Platform as a Service (PaaS): the capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private Cloud: the Cloud infrastructure is operated solely for an organization. It may be managed by the organization or a third party and may exist on-premises or off-premises.

Community Cloud: the Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the Cloud infrastructure is made available to the general public or a large industry group and is owned by an organization selling Cloud services.

Hybrid Cloud: the Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability. At the heart of Cloud computing is an infrastructure comprising a network of interconnected nodes.

Figure 8:
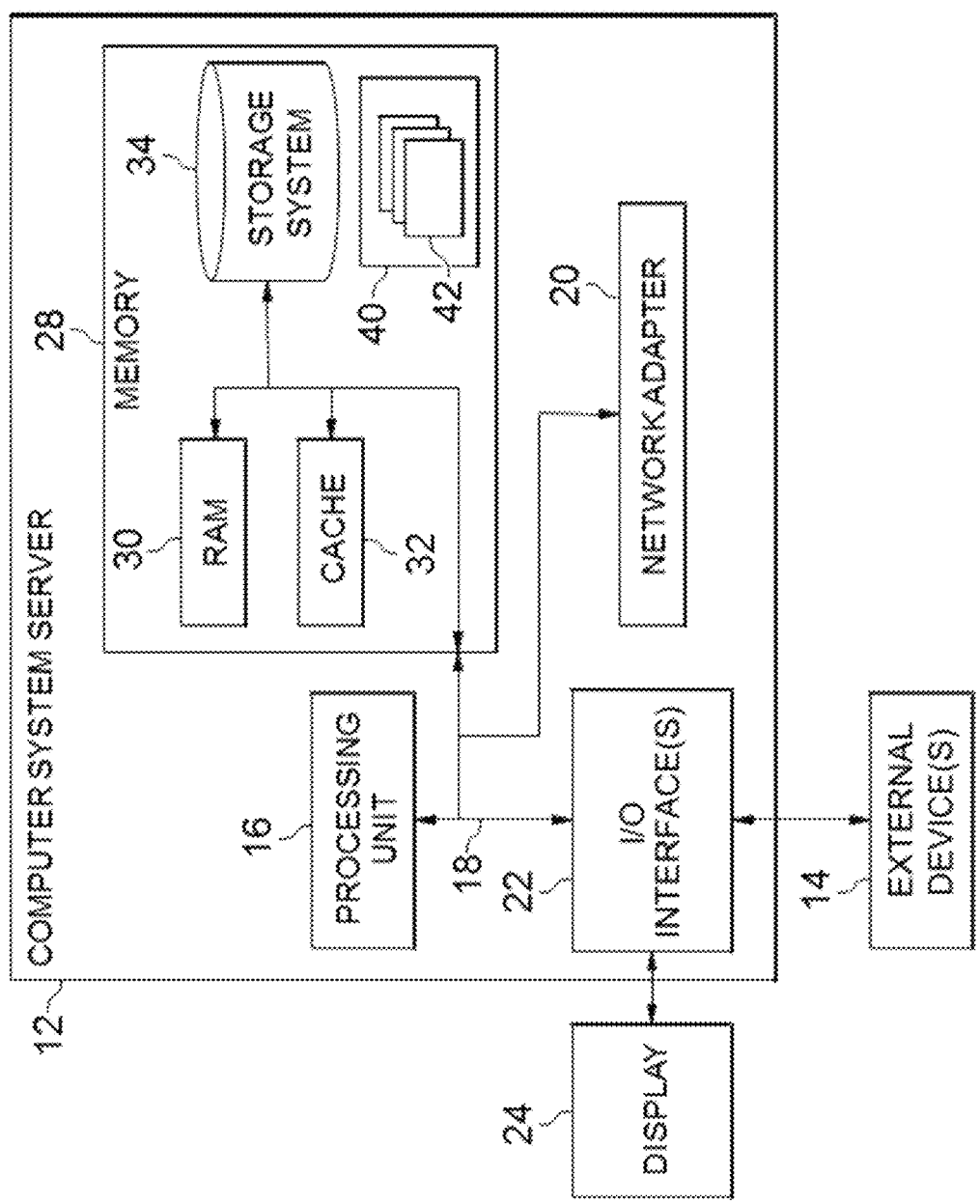
FIG. 8 depicts a Cloud computing node according to an embodiment of the present invention.

Referring now to FIG. 8, a schematic of an example of a Cloud computing node is shown. Cloud computing node 10 is only one example of a suitable node and is not intended to hsuggest any limitation as to the scope of use or functionality of embodiments of the invention described herein. Regardless, Cloud computing node 10 is capable of being implemented and/or performing any of the functionality set forth herein.

Although Cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed Cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed Cloud computing environments where tasks are performed by remote processing circuits that are linked through a communications network. In a distributed Cloud computing environment, program modules may be located in both local and remote computer system storage media including memory storage circuits.

Referring again to FIG. 8, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
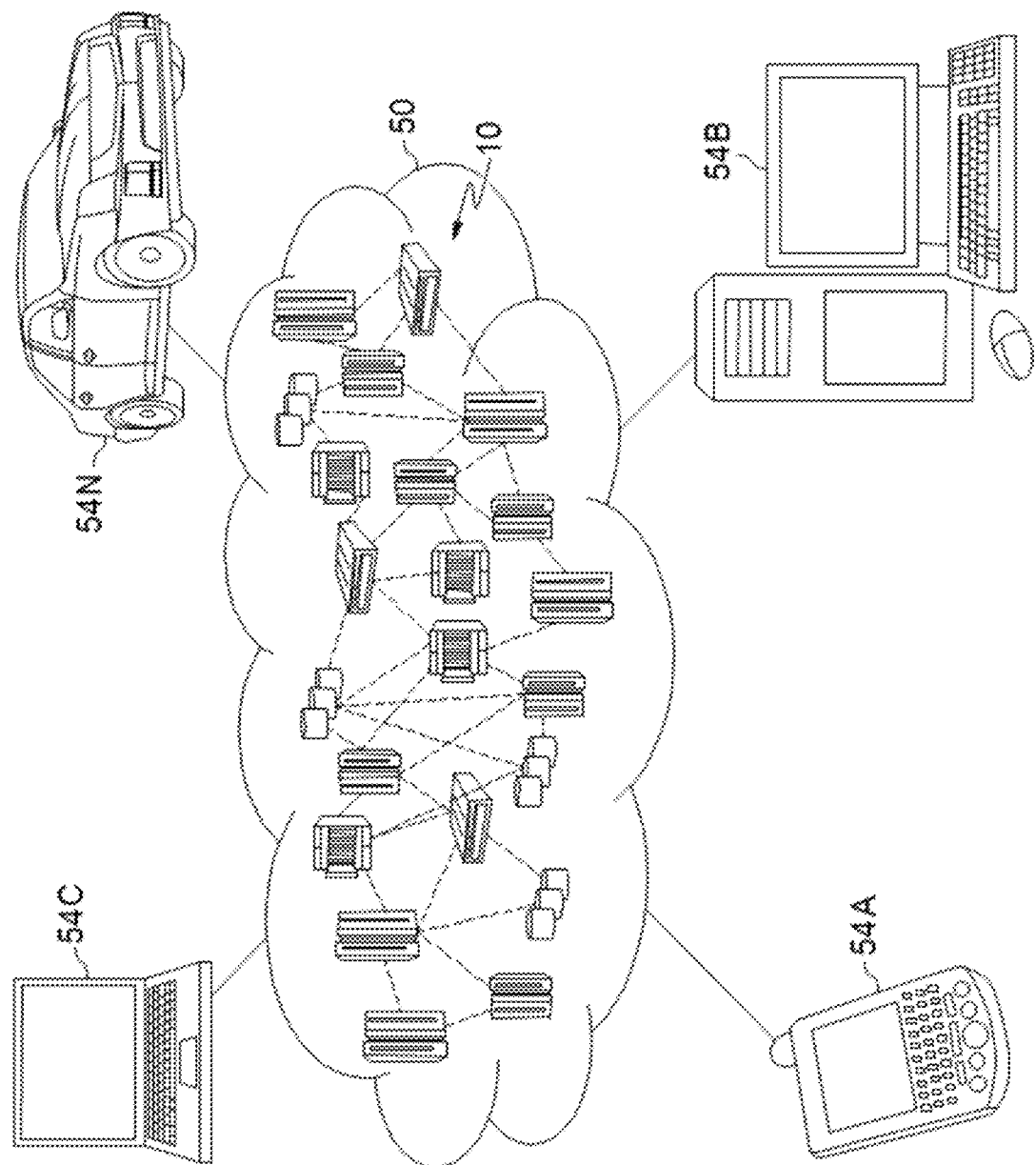
FIG. 9 depicts a Cloud computing environment according to an embodiment of the present invention.

Referring now to FIG. 9, illustrative Cloud computing environment 50 is depicted. As shown, Cloud computing environment 50 comprises one or more Cloud computing nodes 10 with which local computing circuits used by Cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows Cloud computing environment 50 to offer infrastructure, platforms and/or software as services for which a Cloud consumer does not need to maintain resources on a local computing circuit. It is understood that the types of computing circuits 54A-N shown in FIG. 9 are intended to be illustrative only and that computing nodes 10 and Cloud computing environment 50 can communicate with any type of computerized circuit over any type of network and/or network addressable connection (e.g., using a web browser).

Figure 10:
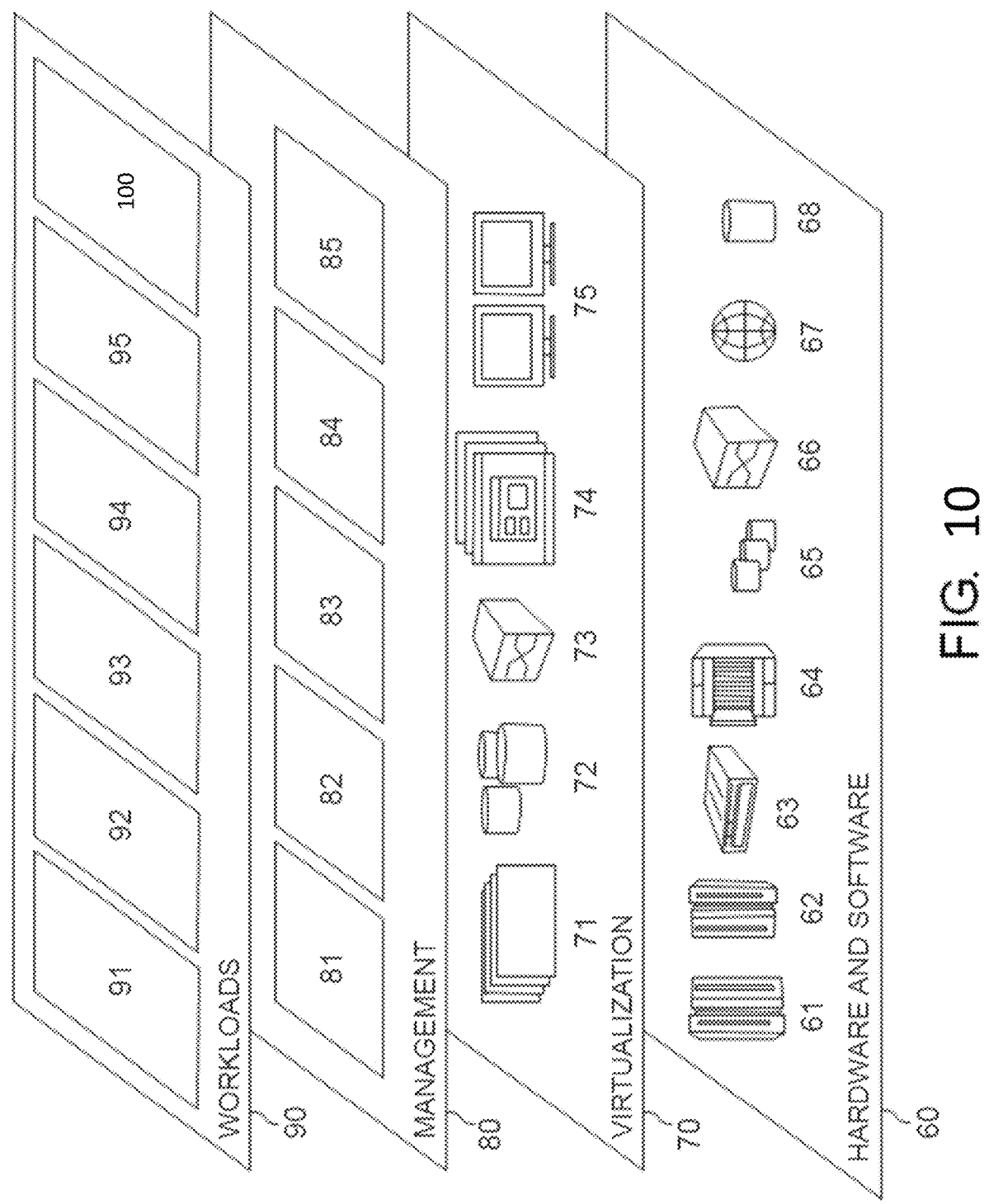
FIG. 10 depicts abstraction model layers according to an embodiment of the present invention.

Referring now to FIG. 10, an exemplary set of functional abstraction layers provided by Cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the Cloud computing environment. Metering and Pricing 82 provide cost tracking as resources are utilized within the Cloud computing environment, and billing or invoicing for consumption of these resources. In one example, these resources may comprise application software licenses. Security provides identity verification for Cloud consumers and tasks, as well as protection for data and other resources. User portal 83 provides access to the Cloud computing environment for consumers and system administrators. Service level management 84 provides Cloud computing resource allocation and management such that required service levels are met. Service Level Agreement (SLA) planning and fulfillment 85 provide pre-arrangement for, and procurement of, Cloud computing resources for which a future requirement is anticipated in accordance with an SLA.

Workloads layer 90 provides examples of functionality for which the Cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the causality analysis method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented causality analysis method using a causal graph depicting a relationship between a system metric and a business metric of an application, the method comprising:
    identifying a value of the system metric resulting from measuring the system metric by monitoring a cross-layer cloud by considering relationships and mapping between information collected at different cloud layers of the cross-layer cloud;
    determining an impact of the measurement of the system metric on the business metric associated with the system metric in the causal graph, the impact being measured as a function of time with a certain interval as a refresh time;
    determining an action to take with respect to the impact on the business metric according to the impact being persistent for the certain interval longer than a predetermined time; and
    performing the action by:
        auto-scaling and auto-configuring resources of a system schema to match the system metric by scaling-up the resources; and
        auto-configuring the resources to remove nodes if the nodes are not being used by the system metric.

2. The computer-implemented method of claim 1, wherein the determining the action comprises:
    identifying one or more policies associated with the business metric.

3. The computer-implemented method of claim 2, wherein the determining the action further comprises:
    identifying one or more actions associated with the business metric; and
    specifying the actions with executable scripts.

4. The computer-implemented method of claim 3, wherein the determining the action further comprises:
    executing the one or more actions associated with the business metrics as the action.

5. The computer-implemented method of claim 1, wherein the determining the impact is based on three-valued logic or a structural equation model.

6. The computer-implemented method of claim 5, wherein the casual graph comprises nodes and each node in the causal graph is a three-valued state or status encoded as a binary string, where a logic operation is converted into a circuit design and implemented as specific circuit.

7. The computer-implemented method of claim 1, wherein the value from measuring the system metric is represented as a leaf node in the causal graph.

8. The computer-implemented method of claim 7, wherein the determining the impact deduces a value for a non-leaf node via Markov property.

9. The computer-implemented method of claim 8, wherein the causal graph comprises a plurality of solutions using a script language.

10. The computer-implemented method of claim 9, wherein the determining the impact recursively computes a decision node from the impact on the business metric from the leaf node and the non-leaf node.

11. The computer-implemented method of claim 10, wherein the leaf node comprises system metrics and a status of the metrics as reported by a monitoring agent,
    wherein the non-leaf node comprises latent metrics through analysis from the leaf node, and
    wherein decision node comprises actionable items for infrastructure, platform and application tuning.

12. The computer-implemented method of claim 1, embodied in a cloud-computing environment.

13. A computer program product for causality analysis, the computer program product comprising a non-transitory computer readable storage medium having program instructions embodied therewith, the program instructions executable by a computer to cause the computer to perform:
  identifying a value of the system metric resulting from measuring the system metric by monitoring a cross-layer cloud by considering relationships and mapping between information collected at different cloud layers of the cross-layer cloud;
  determining an impact of the measurement of the system metric on the business metric associated with the system metric in the causal graph, the impact being measured as a function of time with a certain interval as a refresh time;
  determining an action to take with respect to the impact on the business metric according to the impact being persistent for the certain interval longer than a predetermined time; and
  performing the action by:
    auto-scaling and auto-configuring resources of a system schema to match the system metric by scaling-up the resources; and
    auto-configuring the resources to remove nodes if the nodes are not being used by the system metric.

14. The computer program product of claim 13, wherein the determining the action comprises:
  identifying one or more policies associated with the business metric.

15. The computer program product of claim 14, wherein the determining the action further comprises:
  identifying one or more actions associated with the business metric.

16. The computer program product of claim 13, wherein the determining the action further comprises:
  executing the one or more actions associated with the business metrics as the action.

17. The computer program product of claim 13, wherein the determining the impact is based on three-valued logic.

18. A causality analysis system using a causal graph depicting a relationship between a system metric and a business metric of an application, said system comprising:
  a processor; and
  a memory, the memory storing instructions to cause the processor to:
    identify a value of the system metric resulting from measuring the system metric by monitoring a cross-layer cloud by considering relationships and mapping between information collected at different cloud layers of the cross-layer cloud;
    determine an impact of the measurement of the system metric on the business metric associated with the system metric in the causal graph, the impact being measured as a function of time with a certain interval as a refresh time;
    determine an action to take with respect to the impact on the business metric according to the impact being persistent for the certain interval longer than a predetermined time; and
    perform the action by:
      auto-scaling and auto-configuring resources of a system schema to match the system metric by scaling-up the resources; and
      auto-configuring the resources to remove nodes if the nodes are not being used by the system metric.

19. The system of claim 18, embodied in a cloud-computing environment.

20. The computer-implemented method of claim 1, further comprising changing a configuration of the cross-layer cloud using a script to automatically perform the action a next time a same impact of the measurement of the system metric is determined.

* * * * *